No. 734,398. PATENTED JULY 21, 1903.
H. F. BUNDY.
NECK YOKE.
APPLICATION FILED MAR. 28, 1903.
NO MODEL.

Witnesses
E. H. Stewart
F. A. Elmore.

H. F. Bundy, Inventor
by C. A. Snow & Co.
Attorneys.

No. 734,398. Patented July 21, 1903.

UNITED STATES PATENT OFFICE.

HERBERT F. BUNDY, OF MOUNT VISION, NEW YORK.

NECK-YOKE.

SPECIFICATION forming part of Letters Patent No. 734,398, dated July 21, 1903.

Application filed March 28, 1903. Serial No. 150,057. (No model.)

*To all whom it may concern:*

Be it known that I, HERBERT F. BUNDY, a citizen of the United States, residing at Mount Vision, in the county of Otsego and State of New York, have invented a new and useful Neck-Yoke, of which the following is a specification.

My invention relates to neck-yokes, and is especially directed to means for attaching the same to the vehicle-pole, and has for its objects to produce a device of this character which will be simple of construction, efficient in operation, and one in which the neck-yoke will readily conform to the movements of the animals and obviate liability of the reins becoming entangled with the pole or yoke.

To these ends the invention comprises the novel details of construction and combination of parts more fully hereinafter described.

Figure 1:
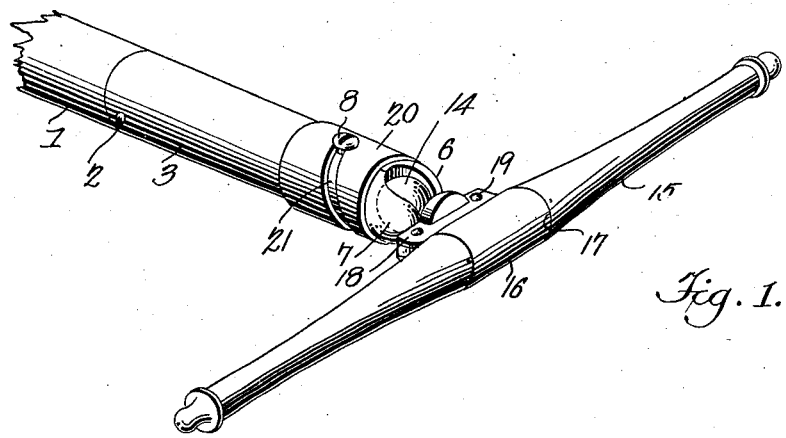
Figures 2, 3:
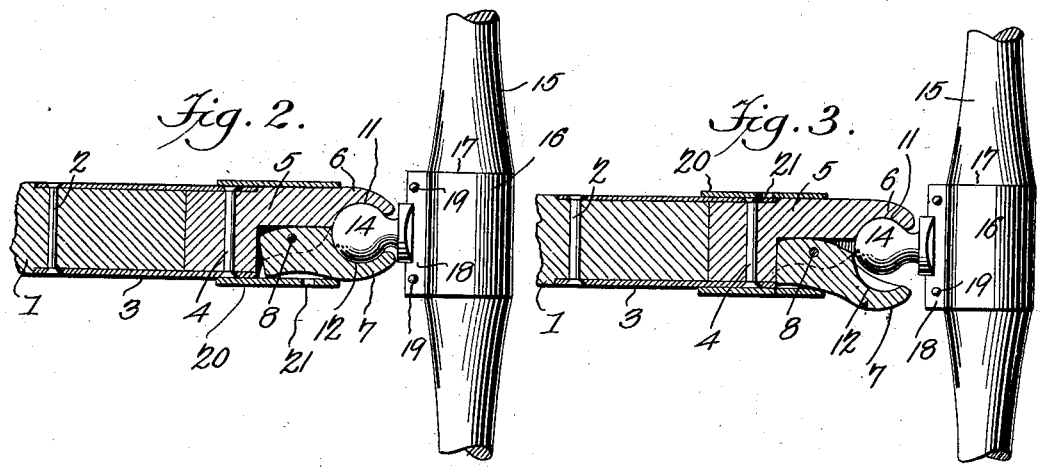
Figure 4:
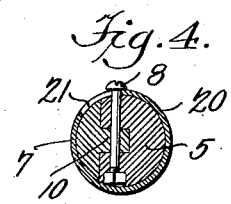

In the accompanying drawings, Figure 1 is a perspective view of the forward portion of a vehicle-pole having a neck-yoke attached thereto in accordance with this invention. Fig. 2 is a central longitudinal sectional elevation taken through the same on a horizontal plane. Fig. 3 is a similar view illustating the socket-jaws in position to release the ball.

Referring to the drawings, 1 indicates the forward end of a vehicle tongue or pole which, in accordance with my invention, has mounted and secured upon its front end, by means of a horizontal bolt 2, a sleeve or ferrule 3. The sleeve, which is preferably of tubular form and composed of some suitable sheet metal wrapped around the pole, has fixed in its front end, by means of a vertical transverse bolt 4, the shank 5 of a socketed member. This socketed member, which is composed of any suitable material, comprises a fixed jaw 6, formed integral with the shank 5, and a movable jaw 7, pivotally associated with the fixed jaw by means of a vertical bolt 8, which is tapped through the body of the member just in advance of the sleeve and engages a tongue or tenon 9, formed upon the movable jaw and seated within a socket or mortise 10, formed in the body of the member. The movable jaw is susceptible of a slight swinging movement in a horizontal plane upon its pivot 8 for the purpose which will presently appear.

The inner faces of the jaws 6 and 7 are provided, respectively, with semispherical sockets 11 12, and these sockets conjointly receive the ball 13 of a ball member 14, which is associated with the neck-yoke 15 by means of a sheet-metal collar 16, which embraces a central reduced portion 17 of the yoke and is secured to laterally-extended arms 18, formed integral with the ball member. The collar 16, which loosely embraces the yoke for rotation relative thereto, is attached to the arms 18, preferably by bolts 19.

20 indicates a locking member which serves to maintain the socketed jaws in their closed position in engagement with the ball, but which is operable to permit opening of the jaws to release the ball when it is desired to detach the neck-yoke from the pole. This member preferably comprises a rotatable sheet-metal sleeve which is provided with a bayonet-slot 21, through which is passed the bolt 8, which secures the movable to the fixed jaw and which, as will be readily seen, serves the additional function of a pin upon which the bayonet-slot works when the member is rotated for imparting to the member a movement longitudinally of the tongue for moving the same into and out of engagement with the jaws to lock or release the same, as circumstances may require and as will be readily understood.

In practice, supposing the parts to be in the position illustrated in Fig. 2, with the socketed jaws holding the ball between them, the yoke will be freely movable to conform to the various movements of the animals, and thus liability of the reins becoming entangled with the pole or yoke is obviated. With the parts in this position, if it is desired to disengage the yoke from the pole the locking sleeve 20 will be given a half-turn, which action will, through the engagement of its bayonet-slot with the bolt 8, serve to retract the same from its normal position overlying the jaws, thus freeing the latter and permitting movement of the movable jaw to release the ball from its socket.

From the foregoing it will be seen that I produce a simple and durable device which in practice will efficiently perform its functions, and in attaining these ends it is so be understood that I do not limit or confine myself to the precise details herein shown and described, inasmuch as various minor changes may be made therein without departing from the spirit or scope of my invention.

Having thus described my invention, what I claim is—

1. In a device of the class described, the combination with a neck-yoke, of a vehicle-pole, a ball member associated with one of said parts, a socketed member associated with the other and comprising a fixed jaw and a pivoted jaw, a pin projecting from the member, and a sleeve mounted on a member and provided with a bayonet-slot engaging the pin, said sleeve being operable for engaging or releasing the movable jaw.

2. In a device of the class described, the combination with a neck-yoke, of a collar embracing the same, a ball member associated with the collar, a vehicle-pole, a ferrule mounted thereon, a socketed member having a shank seated in the ferrule and provided with a fixed and a movable jaw, a bolt pivotally associating the jaws and projecting laterally from the member, and a locking-sleeve mounted upon the member and provided with a bayonet-slot engaging the bolt, said sleeve being operable for engaging or releasing the movable jaw.

In testimony that I claim the foregoing as my own I have hereto affixed my signature in the presence of two witnesses.

HERBERT F. BUNDY.

Witnesses:
ADDISON ROBINSON,
HARRY C. BUNN.